(12) United States Patent
Okuda et al.

(10) Patent No.: US 8,740,388 B2
(45) Date of Patent: Jun. 3, 2014

(54) LIGHT SOURCE APPARATUS AND PROJECTION DISPLAY APPARATUS

(75) Inventors: Michihiro Okuda, Hirakata (JP); Shinya Matsumoto, Uji (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 256 days.

(21) Appl. No.: 13/194,613

(22) Filed: Jul. 29, 2011

(65) Prior Publication Data

US 2012/0081672 A1 Apr. 5, 2012

(30) Foreign Application Priority Data

Jul. 29, 2010 (JP) ................................. 2010-171210

(51) Int. Cl.
*G03B 21/14* (2006.01)

(52) U.S. Cl.
USPC ................. 353/20; 353/30; 353/31; 353/34; 353/38; 353/84; 349/7; 349/9; 362/231

(58) Field of Classification Search
USPC ........... 353/20, 30, 31, 33, 34, 37, 38, 84, 97, 353/98, 122; 362/227, 231, 553, 555, 583, 362/561, 620, 626; 349/5, 7–9, 25, 65, 106; 348/744, 745, E5.137
See application file for complete search history.

(56) References Cited

U.S. PATENT DOCUMENTS

| 6,947,198 | B2 * | 9/2005 | Morikawa et al. | 359/291 |
| 8,123,366 | B2 * | 2/2012 | Akiyama | 353/98 |
| 8,123,367 | B2 * | 2/2012 | Nagashima et al. | 353/98 |
| 8,403,492 | B2 * | 3/2013 | Shibasaki | 353/31 |
| 2008/0225237 | A1 * | 9/2008 | Amano et al. | 353/20 |
| 2011/0043762 | A1 * | 2/2011 | Miyamae et al. | 353/20 |
| 2011/0051095 | A1 * | 3/2011 | Narimatsu et al. | 353/31 |

FOREIGN PATENT DOCUMENTS

JP 2004-341105 A 12/2004

* cited by examiner

*Primary Examiner* — Sultan Chowdhury
(74) *Attorney, Agent, or Firm* — Westerman, Hattori, Daniels & Adrian, LLP

(57) ABSTRACT

A light source apparatus includes: a light source that emits blue component light; a polarization adjuster that adjusts a polarization state of the blue component light emitted from the light source; a separation optical element that separates the blue component light emitted from the light source into a first optical path and a second optical path according to the polarization state adjusted by the polarization adjuster, the first optical path being for using the blue component light as excitation light, the second optical path being for using the blue component light as reference image light; a luminous body provided on the first optical path and that emits reference image light in response to the excitation light; and a combine optical element that combines the first optical path and the second optical path into a single optical path.

6 Claims, 15 Drawing Sheets

LIGHT SOURCE APPARATUS AND PROJECTION DISPLAY APPARATUS

CROSS REFERENCE TO RELATED APPLICATIONS

This application is based upon and claims the benefit of priority from prior Japanese Patent Application No. 2010-171210, filed on Jul. 29, 2010; the entire contents of which are incorporated herein by reference.

BACKGROUND OF THE INVENTION

1. Field of the Invention

The present invention relates to a light source apparatus including a light source that emits excitation light and luminous bodies each that emits predetermined-color component light in response to excitation light and also relates to a projection display apparatus.

2. Description of the Related Art

There has been known a projection display apparatus including: a light source; an imager that modulates light emitted from the light source; and a projection unit that projects light emitted from the imager on a projection surface.

Meanwhile, there has been proposed a projection display apparatus including luminous bodies that emits reference image light such as red component light, green component light, and blue component light in response to excitation light emitted from the light source (for example, Japanese Patent Application Publication No. 2004-341105). Specifically, multiple types of luminous bodies that emit respective color component lights are provided to a color wheel. When the color wheel rotates, the color component lights are emitted in a time-shared manner.

Meanwhile, a case is conceivable in which the blue component light is used as the reference image light. In such a case, the red component light and the green component light are emitted from luminous bodies by using the blue component light as the excitation light. As for the blue component light, the blue component light emitted from the light source is used as it is.

Accordingly, there are demands for separating an optical path of the blue component light emitted from the light source into a first optical path for using part of blue component light as the excitation light and a second optical path for using the remaining blue component light as the reference image light.

SUMMARY OF THE INVENTION

A light source apparatus according to a first feature includes: a light source (light source 10B) that emits blue component light; a polarization adjuster (polarization adjuster 20) that adjusts a polarization state of the blue component light emitted from the light source; a separation optical element (e.g. separation optical element 30) that separates the blue component light emitted from the light source into a first optical path and a second optical path according to the polarization state adjusted by the polarization adjuster, the first optical path being for using the blue component light as excitation light, the second optical path being for using the blue component light as reference image light; a luminous body (e.g. luminous body 41) provided on the first optical path and that emits reference image light in response to the excitation light; and a combine optical element (e.g. combine optical element 61) that combines the first optical path and the second optical path into a single optical path.

In the first feature, the light source apparatus further includes a separation/combine optical element (separation/combine optical element 150) that separates the blue component light emitted from the light source into a plurality of optical paths for using the blue component light as the excitation light and that combines a plurality of optical paths of the reference image light emitted in response to the excitation light into a single optical path.

In the first feature, the luminous body is provided on a rotary body (e.g. color wheel 180 or rotary drum 220) provided on the first optical path.

A projection display apparatus according to a second feature includes; a light source (light source 10B) that emits blue component light; a polarization adjuster (polarization adjuster 20) that adjusts a polarization state of the blue component light emitted from the light source; a separation optical element (e.g. separation optical element 30) that separates the blue component light emitted from the light source into a first optical path and a second optical path according to the polarization state adjusted by the polarization adjuster, the first optical path being for using the blue component light as excitation light, the second optical path being for using the blue component light as reference image light; a luminous body (e.g. luminous body 41) provided on the first optical path and that emits reference image light in response to the excitation light; a combine optical element (e.g. combine optical element 61) that combines the first optical path and the second optical path into a single optical path; an imager (DMD 110) provided on the single optical path and that modulates light emitted from the combine optical element; and a projection unit (projection unit 120) that projects light emitted from the imager.

A projection display apparatus according to a third aspect includes; a light source (light source 10B) that emits blue component light; a polarization adjuster (polarization adjuster 20) that adjusts a polarization state of the blue component light emitted from the light source; a separation optical element (e.g. separation optical element 30A) that separates the blue component light emitted from the light source into a first optical path and a second optical path according to the polarization state adjusted by the polarization adjuster, the first optical path being for using the blue component light as excitation light, the second optical path being for using the blue component light as reference image light; an ellipsoidal reflector (ellipsoidal reflector 40) provided on the first optical path and having a first focal position and a second focal position; a luminous body (e.g. luminous body 41R, luminous body 41G) that emits reference image light toward the ellipsoidal reflector in response to the excitation light reflected by the ellipsoidal reflector; a combine optical element (combine optical element 160) that combines the first optical path and the second optical path into a single optical path; a rod integrator (rod integrator 80) provided on the single optical path and configured to homogenize light, the light being emitted from the combine optical element; an imager (DMD 110) that modulates light emitted from the rod integrator; and a projection unit (projection unit 120) that projects light emitted from the imager. The first focal position is provided closer to the ellipsoidal reflector than the second focal position. The luminous body is provided at the first focal position. A light incident surface of the rod integrator is provided at the second focal position.

DETAILED DESCRIPTION OF THE EMBODIMENTS

Figure 1:
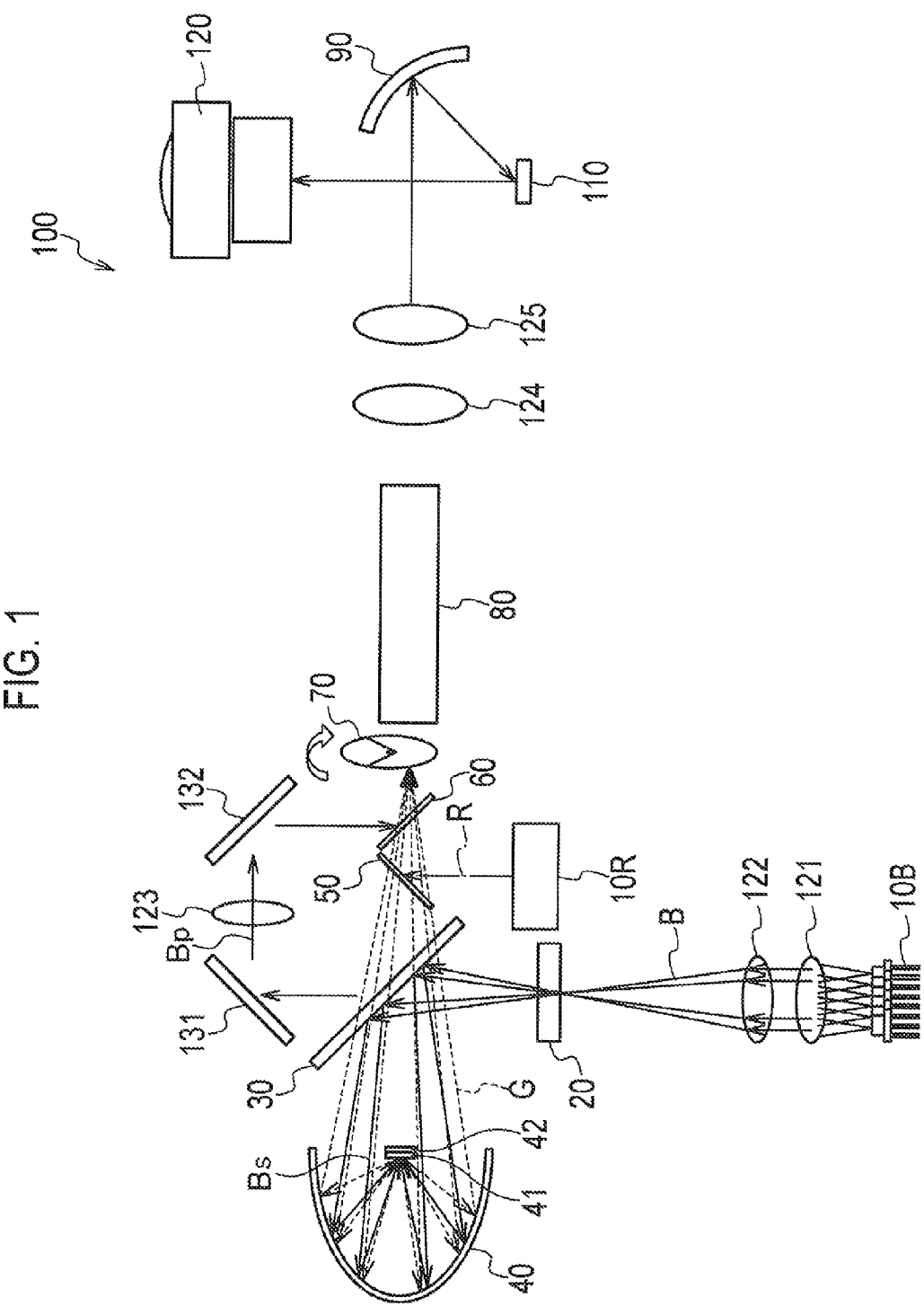
FIG. 1 is a diagram showing a projection display apparatus 100 according to First Embodiment.

Hereinbelow, a description is given of a light source apparatus and a projection display apparatus according to an embodiment of the present invention by referring to the drawings. Note that, in the following description of the drawings, same or similar reference signs denote same or similar elements and portions.

In addition, it should be noted that the drawings are schematic, and ratios of dimensions and the like are different from actual ones. Therefore, specific dimensions and the like should be determined in consideration of the following description. Moreover, the drawings also include portions having different dimensional relationships and ratios from each other.

[Overview of Embodiment]

A light source apparatus according to the embodiment includes: a light source that emits blue component light; a polarization adjuster that adjusts a polarization state of the blue component light emitted from the light source; a separation optical element that separates the blue component light emitted from the light source into a first optical path and a second optical path according to the polarization state adjusted by the polarization adjuster, the first optical path being for using the blue component light as excitation light, the second optical path being for using the blue component light as reference image light; a luminous body provided on the first optical path and that emits reference image light in response to the excitation light; and a combine optical element that combines the first optical path and the second optical path into a single optical path.

According to the embodiment, the separation optical element separates the blue component light emitted from the light source into the first optical path and the second optical path according to the polarization state adjusted by the polarization adjuster. This makes it possible to use the blue component light emitted from the light source not only as the reference image light but also as the excitation light.

Note that the reference image light is light that forms an image, and is red component light, green component light or the blue component light, for example.

[First Embodiment]

(Projection Display Apparatus)

Hereinbelow, a description is given of a light source apparatus and a projection display apparatus according to First Embodiment of the present invention by referring to the drawings. FIG. 1 is a diagram showing a projection display apparatus 100 according to First Embodiment. Note that First Embodiment illustrates a case where the red component light 11, the green component light G, and the blue component light B are used as reference image light.

Firstly, as shown in FIG. 1, the projection display apparatus 100 includes a light source 10, a polarization adjuster 20, a separation optical element 30, an ellipsoidal reflector 40, a combine optical element 50, a combine optical element 60, a diffusion wheel 70, a rod integrator 80, a reflection mirror 90, a DMD 110, and a projection unit 120.

The light source 10 includes a light source 10B and a light source 10R. The light source 10B emits the blue component light B having a high degree of polarization. The blue component light B is used not only as the reference image light but also as the excitation light for the green component light G. The light source 10R emits the red component light R as the reference image light. The light source 10B and the light source 10R are, for example, laser diodes (LDs), light emitting diodes (LEDs), or the like.

The polarization adjuster 20 adjusts the polarization state of the blue component light B. Specifically, the polarization adjuster 20 adjusts the polarization state thereof in accordance with a value of a voltage applied to the polarization adjuster 20.

For example, the polarization adjuster 20 adjusts the entire blue component light B to be emitted from the polarization adjuster 20, to a P-polarization component. Alternatively, the polarization adjuster 20 adjusts the entire blue component light B to be emitted from the polarization adjuster 20, to an S-polarization component. Note that the polarization adjuster 20 may adjust the percentages of the P-polarization component and the S-polarization component of the blue component light B to be emitted from the polarization adjuster 20, in a range from 0% to 100%, respectively.

The separation optical element 30 separates an optical path of the blue component light B emitted from the light source 10B. Specifically, the separation optical element 30 separates the optical path of the blue component light B emitted from the light source 10B into the first optical path and the second optical path. The first optical path is an optical path for using the blue component light B as the excitation light, while the second optical path is an optical path for using the blue component light B as the reference image light.

Figure 2:
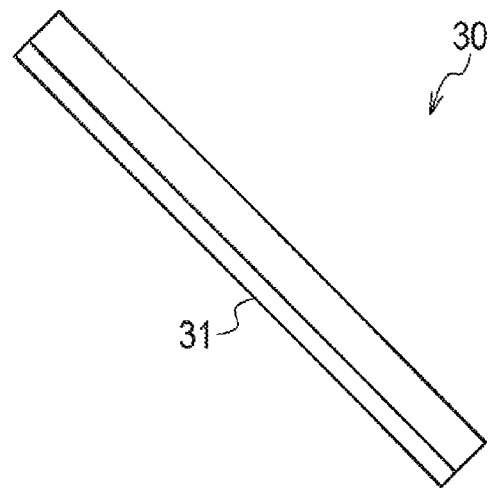
FIG. 2 is a diagram for explaining a separation optical element 30 according to First Embodiment.
Figure 3:
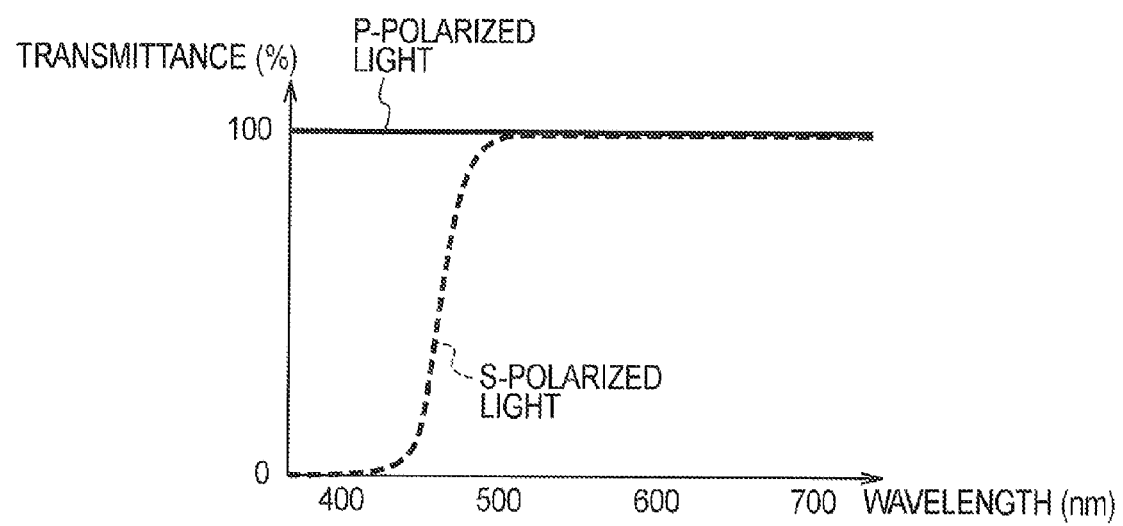
FIG. 3 is a graph for explaining the separation optical element 30 according to First Embodiment.

Specifically, as shown in FIG. 2, the separation optical element 30 includes a dielectric multilayer 31. As shown in FIG. 3, the dielectric multilayer 31 transmits the P-polarization component in any waveband and reflects the S-polarization component in a waveband corresponding to the blue component light B. Note that the dielectric multilayer 31 transmits the S-polarization component in a waveband corresponding to component lights other than the blue component light B.

Referring back to FIG. 1, the ellipsoidal reflector 40 is provided on the first optical path for using the blue component light B as the excitation light. The ellipsoidal reflector 40 is formed of an ellipse concave mirror and has a first focal position and a second focal position. The first focal position is provided closer to the ellipsoidal reflector 40 than the second focal position.

At the first focal position of the ellipsoidal reflector 40, a luminous body 41 and a reflection mirror 42 are provided. This can reduce the sizes of the luminous body 41 and the reflection mirror 42.

The luminous body 41 is arranged closer to the ellipsoidal reflector 40 than the reflection mirror 42. The luminous body 41 is a fluorophor or a phosphor. Specifically, the luminous body 41 emits the green component light G in response to the blue component light B (excitation light) reflected on the ellipsoidal reflector 40.

The reflection mirror 42 reflects the green component light G emitted from the luminous body 41 toward the ellipsoidal reflector 40. Note that the reflection mirror 42 may reflect the remaining component light of the blue component light B toward the luminous body 41.

The combine optical element 50 is formed by a dichroic mirror. Specifically, the combine optical element 50 transmits the green component light G reflected on the ellipsoidal reflector 40 and reflects the red component light R emitted from the light source 10R. That is, the combine optical element 50 combines optical paths of the green component light G and the red component light R into a single optical path.

The combine optical element 60 is formed by a dichroic mirror. Specifically, the combine optical element 60 transmits the red component light R and the green component light G emitted from the combine optical element 50 and reflects the blue component light B reflected on a mirror 132 to be described later. That is, the combine optical element 60 combines the optical paths of the red component light R, the green component light G, and the blue component light B into a single optical path.

The diffusion wheel 70 is formed so as to be rotatable. At least a part of a wheel surface of the diffusion wheel 70 is formed to be a diffusion surface on which light is diffused. Specifically, the diffusion wheel 70 diffuses the blue component light B to reduce the coherent characteristic. Thus, the size of the diffusion surface is determined so that the diffusion surface can be irradiated with the blue component light B. In addition, the rotation of the diffusion wheel 70 is controlled so that the diffusion surface can be irradiated with the blue component light B.

If the red component light R is required to be diffused, the size of the diffusion surface is determined so that the diffusion surface can be irradiated with the red component light R and the blue component light B. The rotation of the diffusion wheel 70 is controlled so that the diffusion surface can be irradiated with the red component light R and the blue component light B.

Note that since the green component light G has been diffused at the time of being emitted from the luminous body 41, the green component light G does not need to be diffused by the diffusion wheel 70.

The rod integrator 80 is formed by a transparent member such as glass and has a rod shape. Specifically, the rod integrator 80 has a light incident surface, a light emitting surface, and a light reflecting side surface which is provided to extend from the light incident surface to the light emitting surface. The rod integrator 80 homogenizes light, the light being made incident on the rod integrator 80.

In First Embodiment, the light incident surface of the rod integrator 80 is provided at the second focal position of the ellipsoidal reflector 40. This can reduce the size of the light incident surface of the rod integrator 80.

The reflection mirror 90 reflects the light emitted from the rod integrator 80 toward the DMD 110.

The DMD 110 includes multiple micromirrors, which are movable. Basically, each of the micromirrors corresponds to one pixel. The DMD 110 switches whether or not to reflect the light toward the projection unit 120 by changing the angle of each micromirror.

The projection unit 120 projects the light (image light) emitted from the DMD 110 on a projection surface.

Secondly, as shown in FIG. 1, the projection display apparatus 100 includes a group of necessary lenses (a lens 121, a lens 1.22, a lens 123, a lens 124, and a lens 125) and a necessary group of mirrors (a mirror 131 and a mirror 132).

The lenses 121 and 122 concentrate the blue component light B emitted from the light source 10B, for example, on the polarization adjuster 20. The lens 123 is provided on the second optical path and is a relay lens for adjusting the difference between the optical path length of the blue component light B used as the reference image light and the optical path lengths of the other color component lights. The lenses 124 and 125 concentrate the light emitted from the rod integrator 80 so shat the entire surface of the DMD 110 can be irradiated with the light emitted from the rod integrator 80.

The mirrors 131 and 132 are provided on the second optical path and guide the blue component light B used as the reference image light, to the combine optical element 60.

Note that in First Embodiment, a light source apparatus includes the light source 10, the polarization adjuster 20, the separation optical element 30, the ellipsoidal reflector 40, the combine optical element 50, and the combine optical element 60. The light source apparatus may or may not include the diffusion wheel 70 and the rod integrator 80.

(Operations and Effects)

The separation optical element 30 separates the optical path of the blue component light B emitted from the light source 10B into the first optical path and the second optical path according to the polarization state adjusted by the polarization adjuster 20. This makes it possible to use the blue component light B emitted from the light source 10B not only as the reference image light but also as the excitation light.

[Modification 1]

Hereinbelow, a description is given of Modification 1 of First Embodiment. In the following description, differences from First Embodiment are mainly explained.

In First Embodiment, the light source 10R is provided aside from the light source 10B. In contrast, the light source 10R is not provided in Modification 1.

(Projection Display Apparatus)

Figure 4:
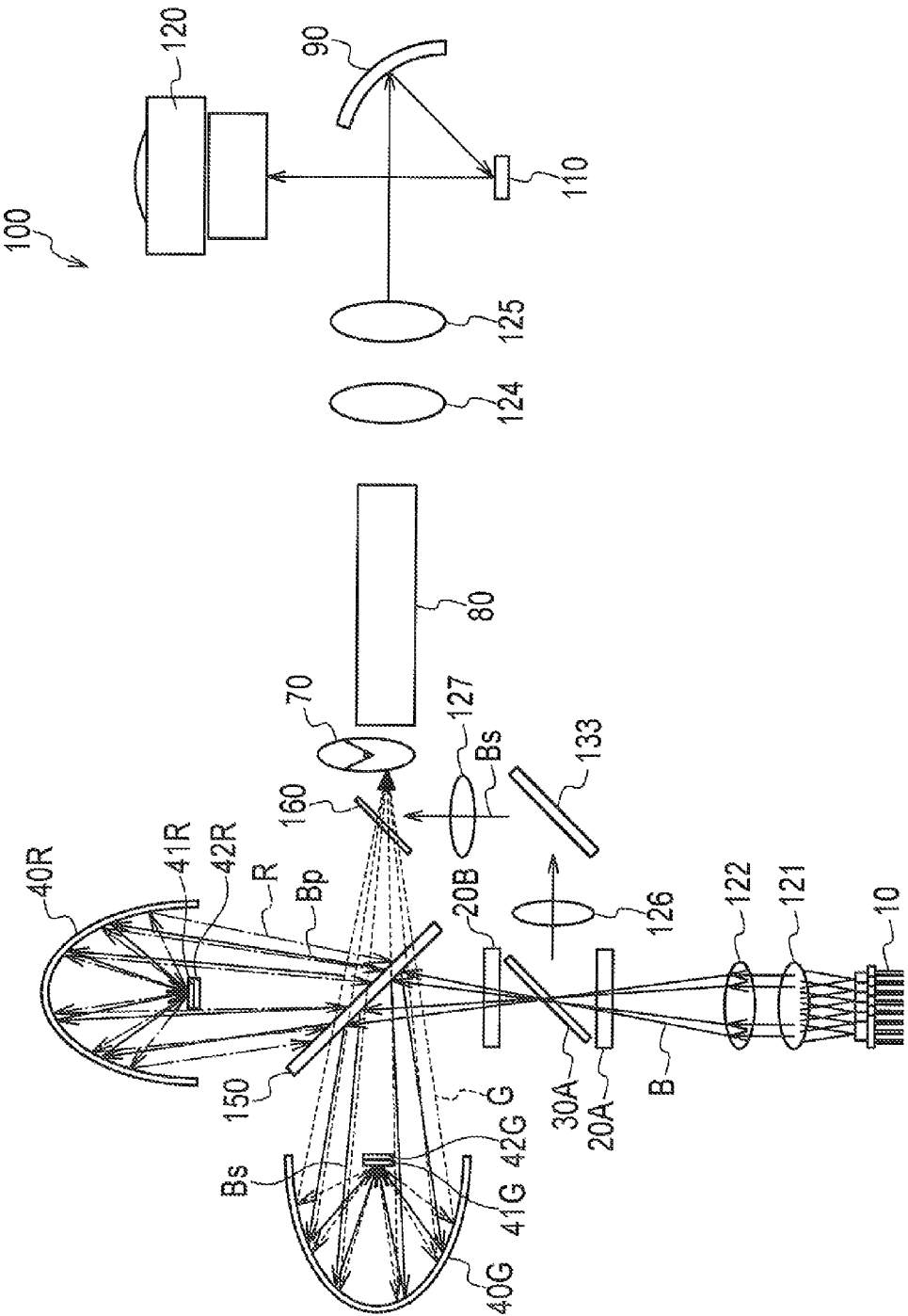
FIG. 4 is a diagram showing a projection display apparatus 100 according to Modification 1.

Hereinbelow, a description is given of a projection display apparatus according to Modification 1 by referring to the drawings. FIG. 4 is a diagram showing a projection display apparatus 100 according to Modification 1. In FIG. 4, the same components as those in FIG. 1 are denoted by the same signs.

As shown in FIG. 4, the projection display apparatus 100 includes a polarization adjuster 20A and a polarization adjuster 20B as the polarization adjuster 20. The projection display apparatus 100 includes an ellipsoidal reflector 40G and an ellipsoidal reflector 40R as the ellipsoidal reflector 40, a luminous body 41G and a luminous body 41R as the luminous body 41, and a reflection mirror 42G and a reflection mirror 42R as the reflection mirror 42. The projection display apparatus 100 includes a separation optical element 30A and a separation/combine optical element 150 instead of the separation optical element 30 and includes a combine optical element 160 instead of the combine optical element 50 and the combine optical element 60.

The polarization adjusters 20A and 20B adjust the polarization state of the blue component light B, like the polarization adjuster 20.

The ellipsoidal reflector 40G is formed by an ellipse concave mirror, like the ellipsoidal reflector 40. The luminous body 41G and the reflection mirror 42G are arranged at a first focal position of the ellipsoidal reflector 40G. The luminous body 41G emits the green component light G in response to the blue component light B (excitation light). The reflection mirror 42G reflects the green component light G toward the ellipsoidal reflector 40G.

The ellipsoidal reflector 40R is formed by an ellipse concave mirror, like the ellipsoidal reflector 40. The luminous body 41R and the reflection mirror 42R are arranged at a first focal position of the ellipsoidal reflector 40R. The luminous body 41R emits the red component light R in response to the blue component light B (excitation light). The reflection mirror 42R reflects the red component light R toward the ellipsoidal reflector 40R.

The separation optical element 30A separates an optical path of the blue component light B emitted from the light source 10B. Specifically, the separation optical element 30A separates the optical path of the blue component light B emitted from the light source 10B into a first optical path and a second optical path. The first optical path is an optical path for using the blue component light B as the excitation light, while the second optical path is an optical path for using the blue component light B as the reference image light. The separation optical element 30A has a configuration similar to the separation optical element 30 shown in FIGS. 2 and 3.

The separation/combine optical element 150 separates the optical path of the blue component light B emitted from the light source 10B. Specifically, the separation/combine optical element 150 separates the optical path of the blue component light B emitted from the light source 10B into a third optical path and a fourth optical path. The third optical path is an optical path for using the blue component light B as the excitation light for the green component light. G, while the fourth optical path is an optical path for using the blue component light B as the excitation light for the red component light R.

Meanwhile, the separation/combine optical element 150 transmits the green component light G reflected on the ellipsoidal reflector 40G and reflects the red component light R reflected on the ellipsoidal reflector 40R. That is, the separation/combine optical element 150 combines the third optical path of the green component light G and the fourth optical path of the red component light R into a single optical path.

Figure 5:
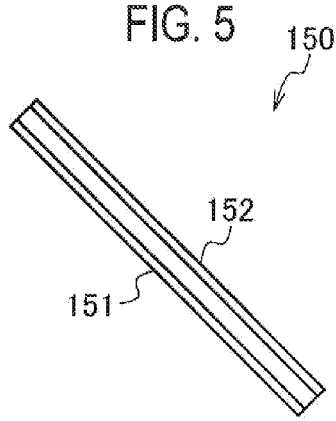
FIG. 5 is a diagram for explaining a separation/combine optical element 150 according to Modification 1.
Figure 6:
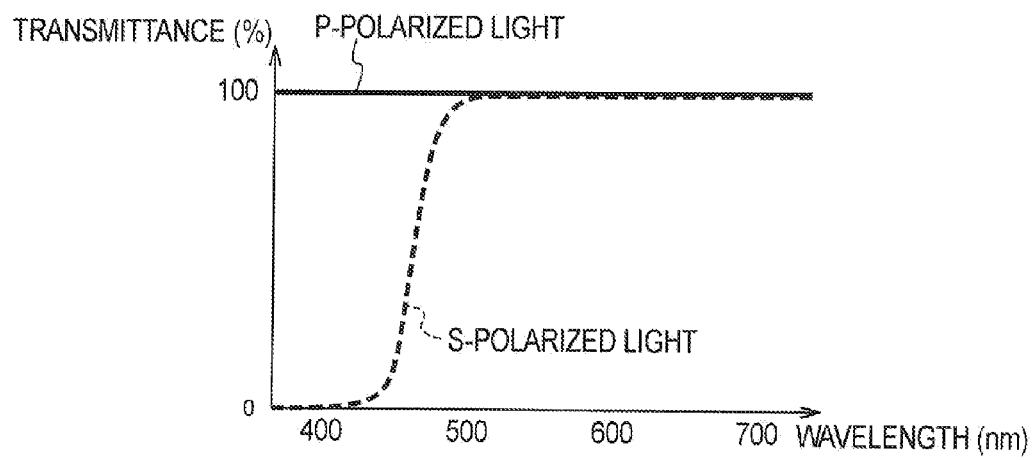
FIG. 6 is a graph for explaining the separation/combine optical element 150 according to Modification 1.
Figure 7:
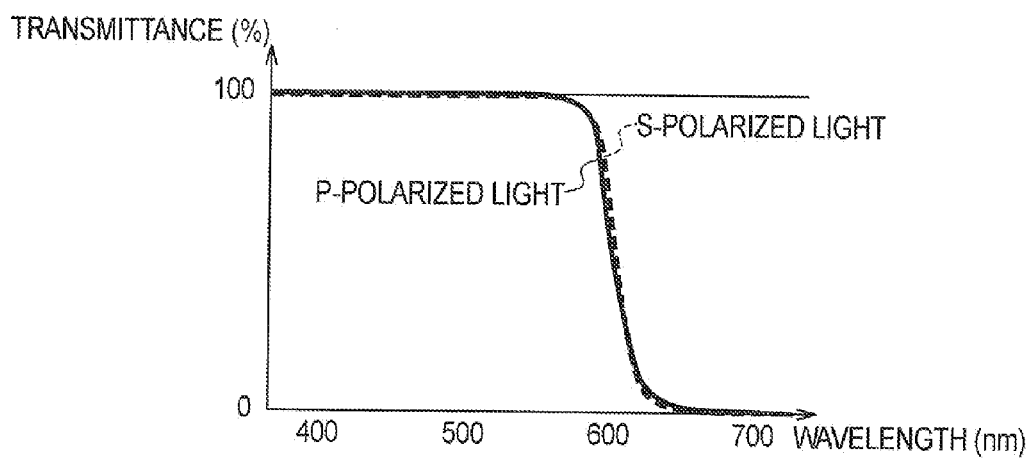
FIG. 7 is a graph for explaining the separation/combine optical element 150 according to Modification 1.

Specifically, as shown in FIG. 5, the separation/combine optical element 150 includes a dielectric multilayer 151 and a dielectric multilayer 152. As shown in FIG. 6, the separation/combine optical element 150 transmits the P-polarization component in any waveband and reflects the S-polarization component in the waveband corresponding to the blue component light B. In addition, the dielectric multilayer 151 transmits the S-polarization component in the waveband corresponding to the component lights other than the blue component light B. In contrast, as shown in FIG. 7, the dielectric multilayer 152 reflects the P-polarization and S-polarization components in a waveband corresponding to the red component light R. In addition, the dielectric multilayer 152 transmits the P-polarization and S-polarization components in a waveband corresponding to component lights other than the red component light R.

Referring back to FIG. 4, the combine optical element 160 is formed by a dichroic mirror. Specifically, the combine optical element 160 transmits the green component light G and the red component light R reflected on the ellipsoidal reflector 40G and the ellipsoidal reflector 40R, respectively, and reflects the blue component light B reflected on a mirror 133 to be described later. That is, the combine optical element 160 combines optical paths of the red component light R, the green component light G, and the blue component light B into a single optical path.

As in First Embodiment, the projection display apparatus 100 includes a group of necessary lenses (a lens 124, a lens 125, a lens 126, and a lens 127) and a necessary mirror (the mirror 133). The lenses 126 and 127 are provided on the second optical path and are relay lenses for adjusting the difference between the optical path length of the blue component light B used as the reference image light and the optical path lengths of the other color component lights. The mirror 133 is provided on the second optical path and guides the blue component light B used as the reference image light, to the combine optical element 1.60.

(Utilization of Red Component Light R)

Figure 8:
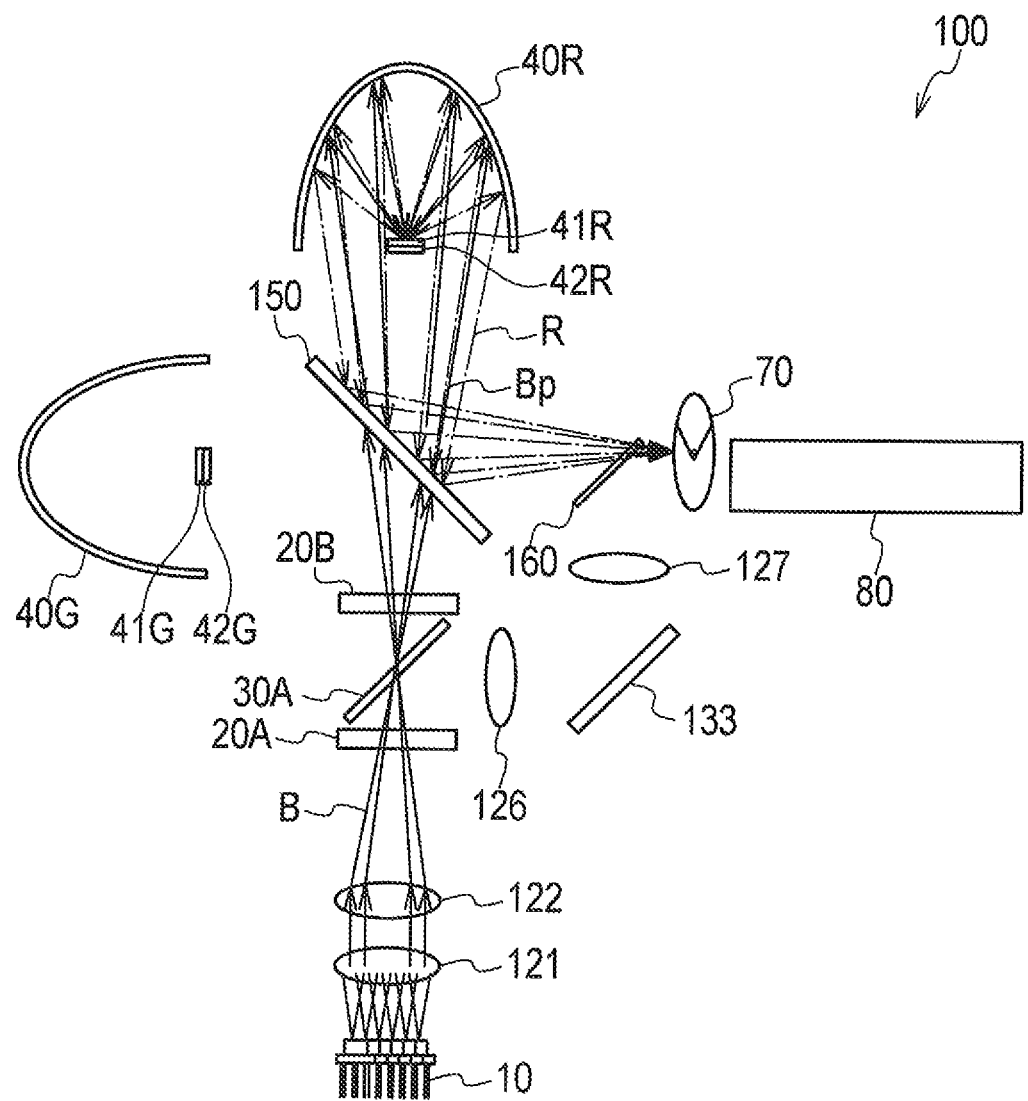
FIG. 8 is a diagram showing utilization of red component light R according to Modification 1.

Hereinbelow, a description is given of utilization of the red component light R according to Modification 1 by referring to FIG. 8. As shown in FIG. 8, the polarization adjusters 20A and 20B adjust the blue component light B to the P-polarization component, whereby the red component light R can be utilized. Specifically, the blue component light B adjusted to the P-polarization component by the polarization adjuster 20A is transmitted through the separation optical element 30A, and the blue component light B adjusted to the P-polarization component by the polarization adjuster 20B is transmitted through the separation/combine optical element 150 (the dielectric multilayers 151 and 152). The red component light R reflected on the ellipsoidal reflector 40R is reflected on the separation/combine optical element 150 (the dielectric multilayer 152). Thereby, the red component light R is guided to the rod integrator 80.

(Utilization of Green Component Light G)

Figure 9:
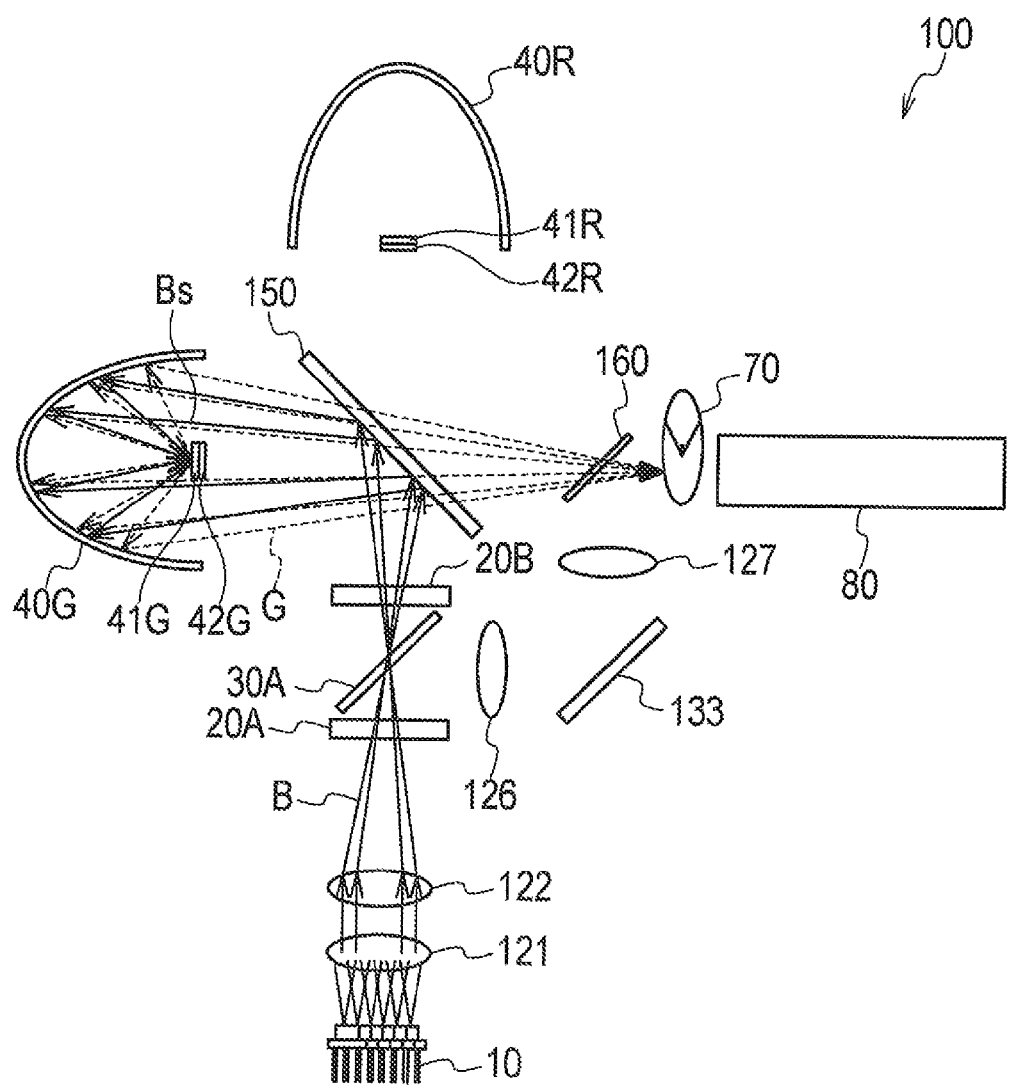
FIG. 9 is a diagram showing utilization of green component light G according to Modification 1.

Hereinbelow, a description is given of utilization of the green component light G according to Modification 1 by referring to FIG. 9. As shown in FIG. 9, the polarization adjuster 20A adjusts the blue component light B to the P-polarization component, and the polarization adjuster 20B adjusts the blue component light B to the S-polarization component, whereby the green component light G can be utilized. Specifically, the blue component light B adjusted to the P-polarization component by the polarization adjuster 20A is transmitted through the separation optical element 30A, and the blue component light B adjusted to the S-polarization component by the polarization adjuster 20B is reflected on the separation/combine optical element 150 (the dielectric multilayer 151). The green component light G reflected on the ellipsoidal reflector 40G is transmitted through the separation/combine optical element 150 (the dielectric multilayers 151 and 152). Thereby, the green component light G is guided to the rod integrator 80.

(Utilization of Blue Component Light B)

Figure 10:
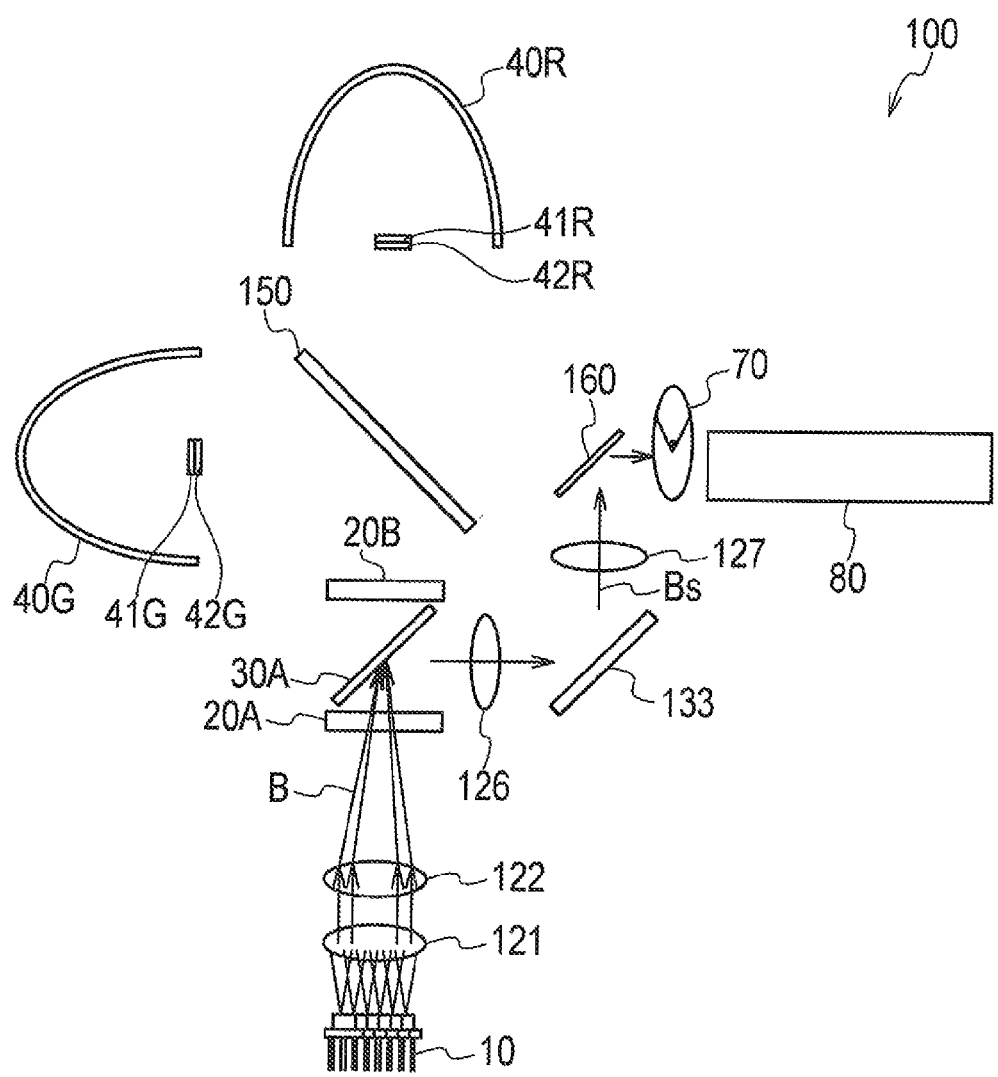
FIG. 10 is a diagram showing utilization of blue component light B according to Modification 1.

Hereinbelow, a description is given of utilization of the blue component light B according to Modification 1 by referring to 10. As shown in FIG. 10, the polarization adjuster 20A adjusts the blue component light B to the S-polarization component, whereby the blue component light B can be utilized. Specifically, the blue component light B adjusted to the S-polarization component by the polarization adjuster 20A is reflected on the separation optical element 30A. Thereby, the blue component light B is guided to the rod integrator 80.

[Modification 2]

Hereinbelow, a description is given of Modification 2 of First Embodiment. In the following description, differences from Modification 1 are mainly explained.

Figure 11:
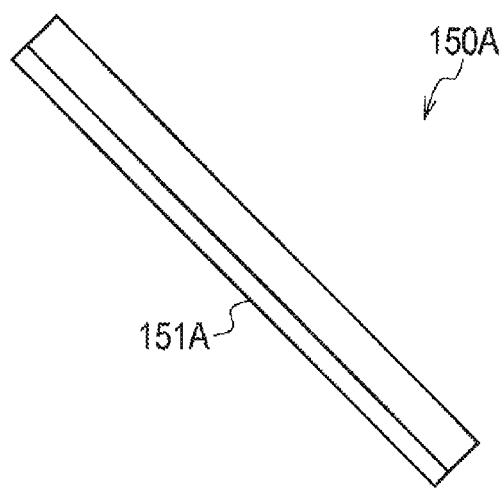
FIG. 11 is a diagram for explaining a separation/combine optical element 150A according to Modification 2.
Figure 12:
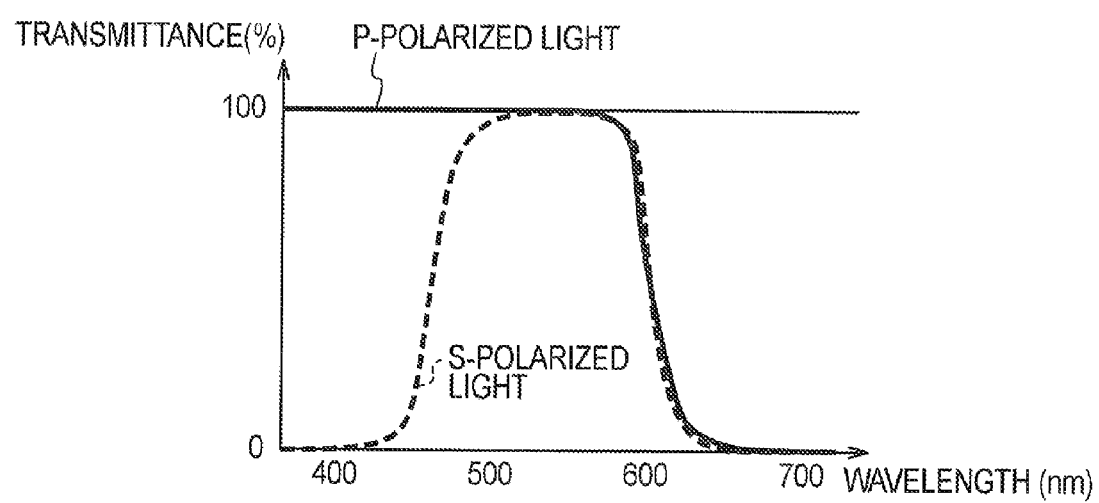
FIG. 12 is a graph for explaining the separation/combine optical element 150A according to Modification 2.

In Modification 2, a separation/combine optical element 150A is provided instead of the separation/combine optical element 150 described above. The separation/combine optical element 150A includes a dielectric multilayer 151A as shown in FIG. 11. The dielectric multilayer 151A reflects the P-polarization component in the waveband corresponding to the red component light R and transmits the P-polarization component in the waveband corresponding to the component lights other than the red component light R. In addition, the dielectric multilayer 151A reflects the S-polarization component in the waveband corresponding to the blue component light B and the red component light R and transmits the S-polarization component in the waveband corresponding to component lights other than the blue component light B and the red component light R.

[Modification 3]

Hereinbelow, a description is given of Modification 3 of First Embodiment. In the following description, differences from First Embodiment are mainly explained.

In First Embodiment, the light source 10R is provided aside from the light source 10B. In contrast, the light source 10R is not provided in Modification 3.

(Projection Display Apparatus)

Figure 13:
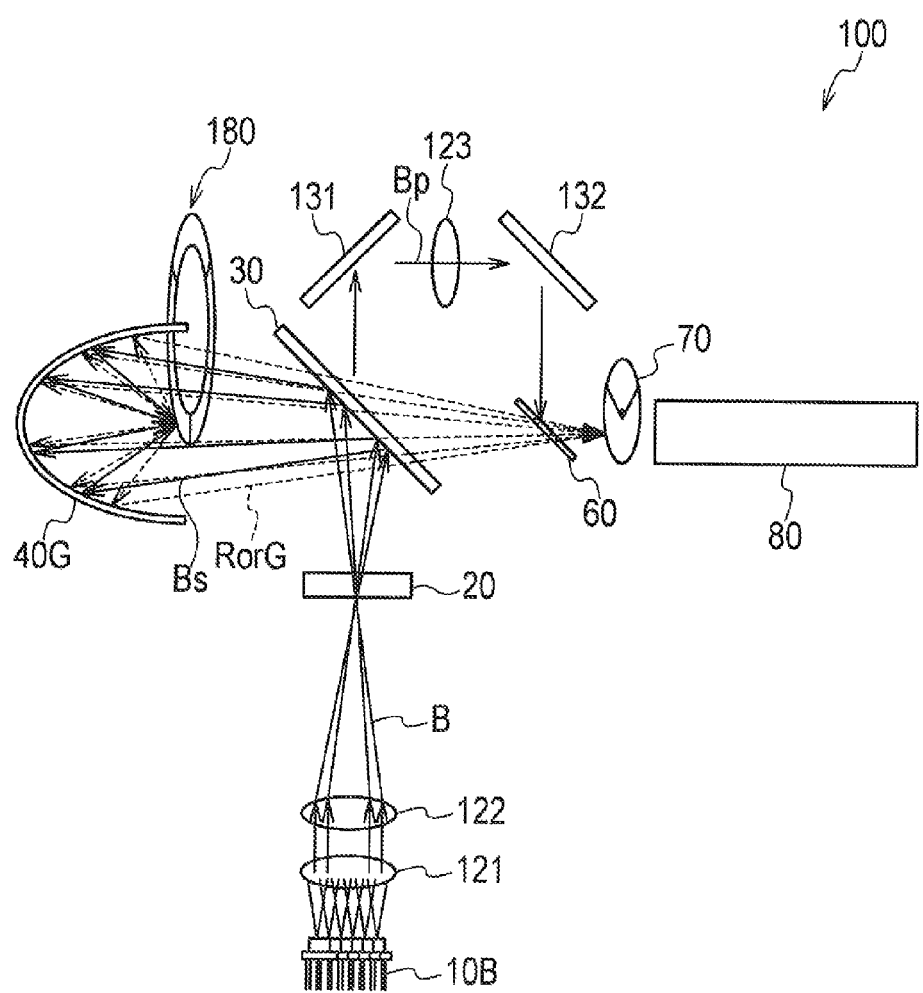
FIG. 13 is a projection display apparatus 100 according to Modification 1.

Hereinbelow, a description is given of a projection display apparatus according to Modification 3 by referring to the drawings. FIG. 13 is a diagram showing a projection display apparatus 100 according to Modification 3. In FIG. 13, the same components as those in FIG. 1 are denoted by the same signs.

As shown in FIG. 13, the projection display apparatus 100 includes a color wheel 180 instead of the luminous body 41 and the reflection mirror 42.

Figure 14:
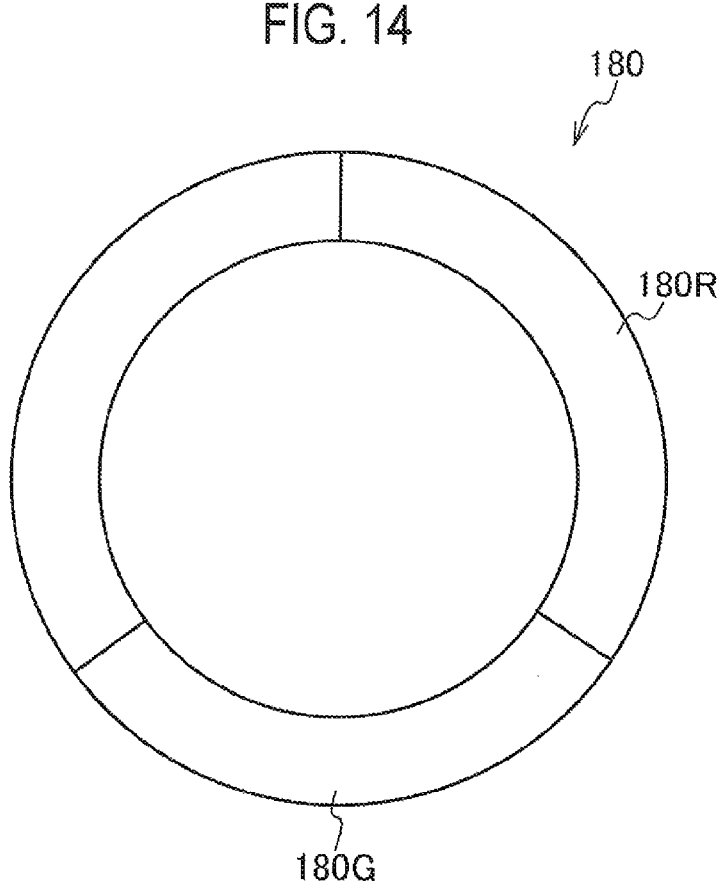
FIG. 14 is a diagram showing a color wheel 180 according to Modification 3.

The color wheel 180 is formed so as to be rotatable. As shown in FIG. 14, the color wheel 180 includes a red region 180R and a green region 180G. The color wheel 180 is arranged at the first focal position of the ellipsoidal reflector 40 so that a surface (the red region 180R or the green region 180G) of the color wheel 180 can be irradiated with the light reflected on the ellipsoidal reflector 40.

Figure 15:
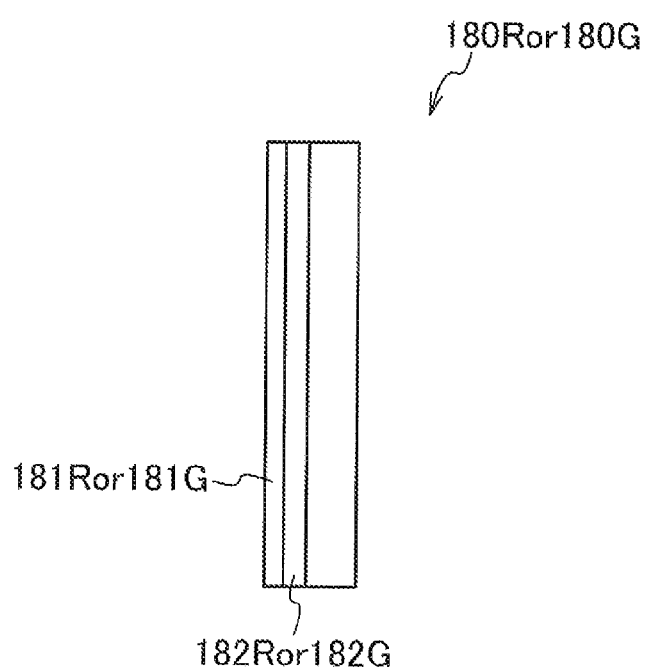
FIG. 15 is a diagram showing the color wheel 180 according to Modification 3.

Meanwhile, the red region 180R (green region 180G) includes a luminous body 181R (a luminous body 181G) and a reflection mirror 182R (a reflection mirror 182G) as shown in FIG. 15.

The luminous body 181R (luminous body 181G) is arranged closer to the ellipsoidal reflector 40 than the reflection mirror 182R (reflection mirror 182G). The luminous body 181B (luminous body 181G) is a fluorophor or a phosphor. Specifically, the luminous body 181R emits the red component light R in response to the blue component light B (excitation light) reflected on the ellipsoidal reflector 40. The luminous body 181G emits the green component light G in response to the blue component light B (excitation light) reflected on the ellipsoidal reflector 40.

The reflection mirror 182R (reflection mirror 182G) reflects the red component light R (green component light G) emitted from the luminous body 181R (luminous body 181G) toward the ellipsoidal reflector 40. Note that the reflection mirror 182R (reflection mirror 182G) may reflect the remaining component light of the blue component light B toward the luminous body 181R (luminous body 181G).

[Modification 4]

Hereinbelow, a description is given of Modification 1 of First Embodiment. In the following description, differences from Modification 3 are mainly explained.

In Modification 3, the optical path of the blue component light B is different from the optical path of the red component light R and the green component light G. In contrast in Modification 4, the optical path of the blue component light B is the same as the optical path of the red component light R and the green component light G.

(Projection Display Apparatus)

Figure 16:
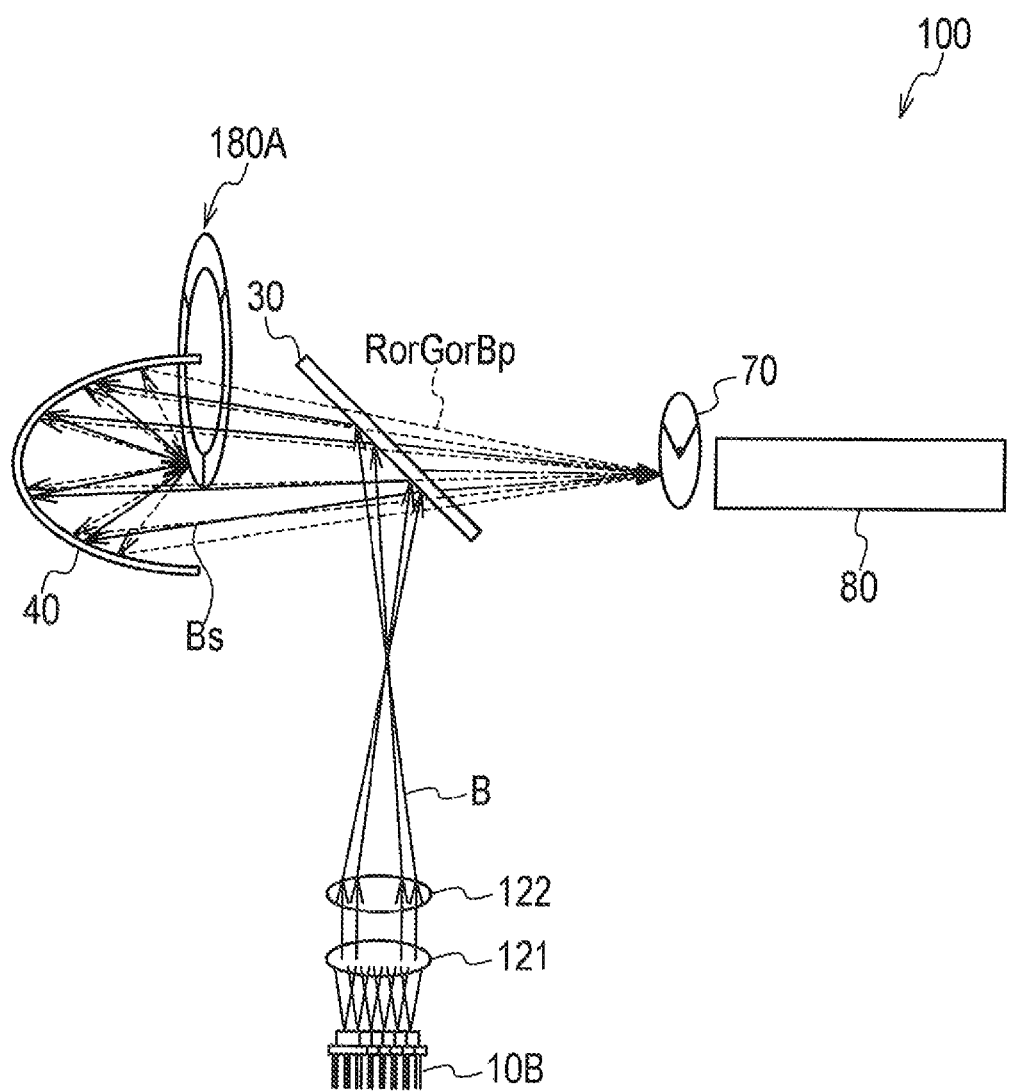
FIG. 16 is a diagram showing a projection display apparatus 100 according to Modification 4.

Hereinbelow, a description is given of a projection display apparatus according to Modification 4 by referring to the drawings. FIG. 16 is a diagram showing a projection display apparatus 100 according to Modification 4. In FIG. 16, the same components as those in FIG. 13 are denoted by the same signs.

As shown in FIG. 16, the projection display apparatus 100 includes a color wheel 180A instead of the color wheel 180.

Figure 17:
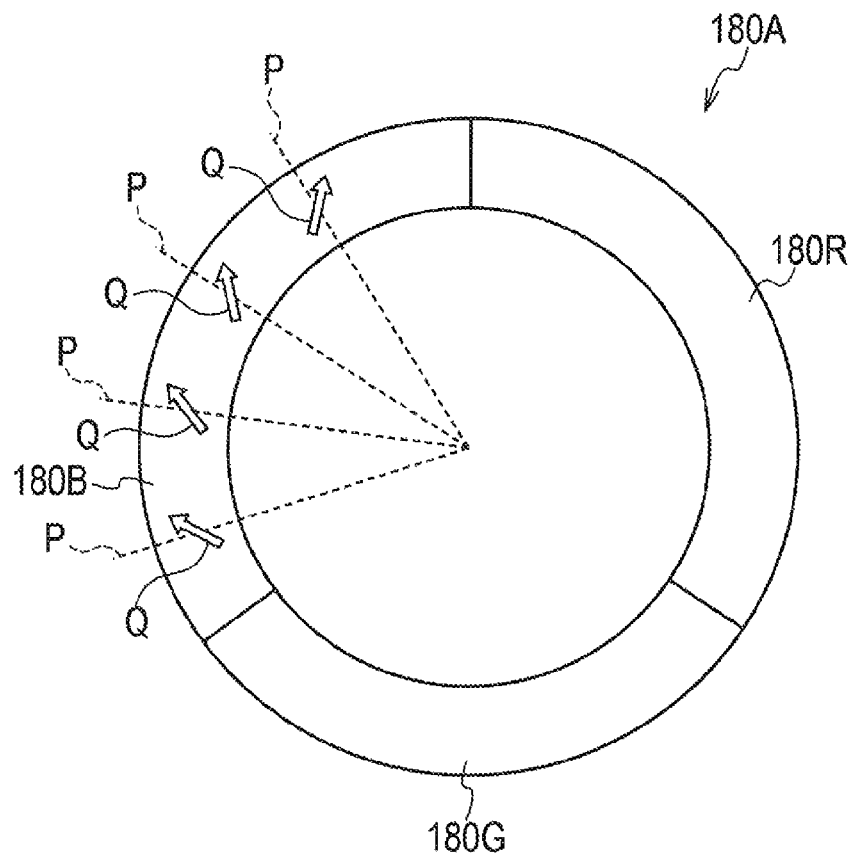
FIG. 17 is a diagram showing a color wheel 180A according to Modification 4.

The color wheel 180A is formed so as to be rotatable like the color wheel 180. As shown in FIG. 17, the color wheel 180A includes a blue region. 180B in addition to the red region 180R and the green region 180G. The structure of the red region 180R and the green region 180G is the same as the structure thereof shown in FIG. 15.

Figure 18:
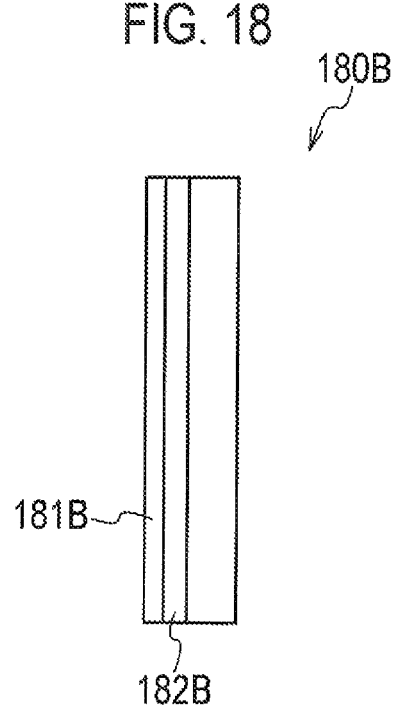
FIG. 18 is a diagram showing the color wheel 180A according to Modification 4.

As shown in FIG. 18, the blue region 180B includes a 114 wave plate 181B and a reflection mirror 182B.

The ¼ wave plate 181B is arranged closer to the ellipsoidal reflector 40 than the reflection mirror 182B. The ¼ wave plate 181B is an element for adjusting the polarization state of the blue component light B. Specifically, the ¼ wave plate 181B adjusts the polarization direction of the blue component light B from a linear polarization direction to a circular polarization direction. Alternatively, the ¼ wave plate 181B adjusts the polarization direction of the blue component light B from the circular polarization direction to the linear polarization direction.

An optical axis of the ¼ wave plate 181B has a certain angle with respect to the polarized blue component light B. Specifically, as shown in FIG. 17, an optical axis Q of the ¼ wave plate 181B has a certain angle with respect to a radius P of the color wheel 180A. Thereby, wherever the blue component light B is made incident in the ¼ wave plate 181B, the polarization state of the blue component light B can be appropriately adjusted.

The reflection mirror 182B reflects the blue component light B reflected on the ellipsoidal reflector 40, toward the ellipsoidal reflector 40.

It should be noted that the polarization direction of the blue component light B is rotated by 90 degrees, because the blue component light B is reflected on the ellipsoidal reflector 40 two times. Thereby, the blue component light B is transmitted through the separation optical element 30.

[Modification 5]

Hereinbelow, a description is given of Modification 5 of First Embodiment. In the following description, differences from First Embodiment are mainly explained. Specifically, a tapered rod is used instead of the ellipsoidal reflector 40 in Modification 5.

(Projection Display Apparatus)

Figure 19:
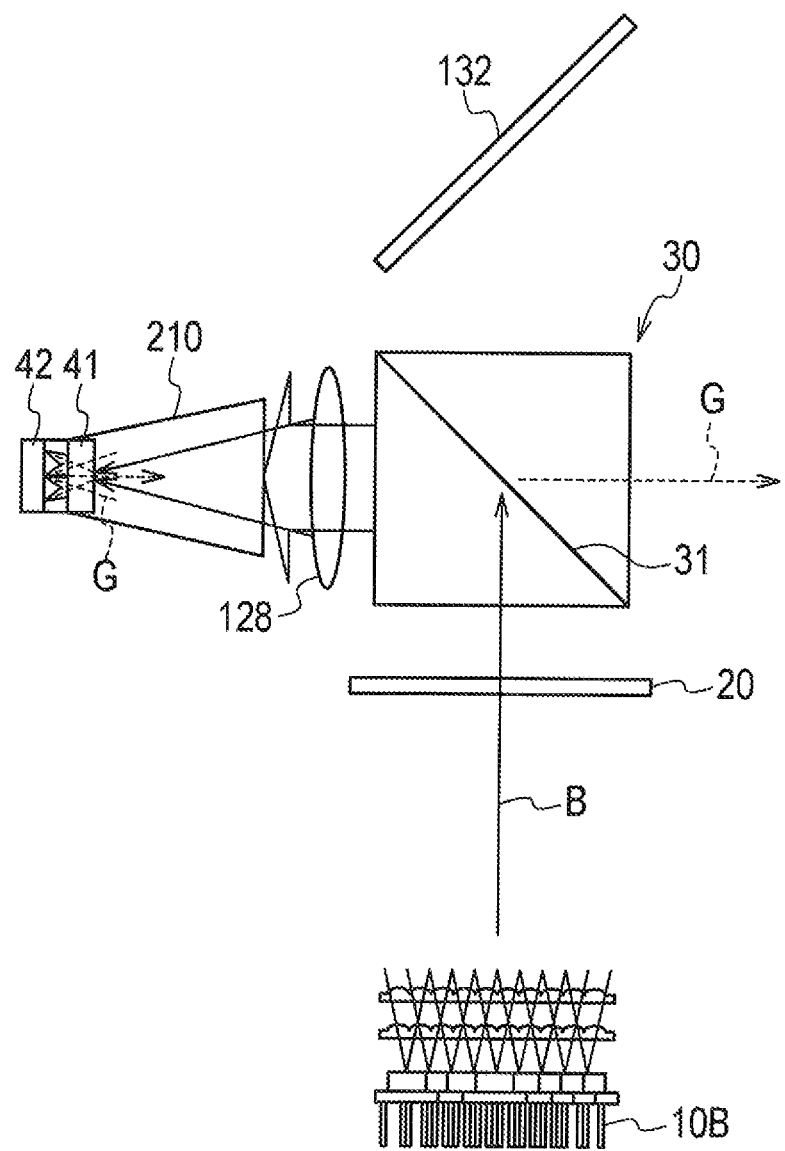
FIG. 19 is a diagram showing a projection display apparatus 100 according to Modification 5.

Hereinbelow, a description is given of a projection display apparatus according to Modification 5 by referring to the drawings. FIG. 19 is a diagram showing a projection display apparatus 100 according to Modification 5. In FIG. 19, the same components as those in FIG. 1 are denoted by the same signs.

As shown in FIG. 19, the projection display apparatus 100 includes a tapered rod 210 instead of the ellipsoidal reflector 40.

The tapered rod 210 is provided with the luminous body 41 and the reflection mirror 42 at one end thereof. The reflection mirror 42 is provided farther from the separation optical element 30 than the luminous body 41 is. The tapered rod 210 makes the green component light G even, the green component light G being emitted from the luminous body 41

The projection display apparatus 100 has a necessary lens 128. The lens 128 concentrates the blue component light B on the luminous body 41 (reflection mirror 42).

Although First Embodiment illustrates the case where the separation optical element 30 has a plate shape, the separation optical element 30 may have a cubic shape as shown in FIG. 19.

[Modification 6]

Hereinbelow, a description is given of Modification 6 of First Embodiment. In the following description, differences from First Embodiment are mainly explained. Specifically, a rotary drum is used instead of the ellipsoidal reflector 40 in Modification 6.

(Projection Display Apparatus)

Figure 20:
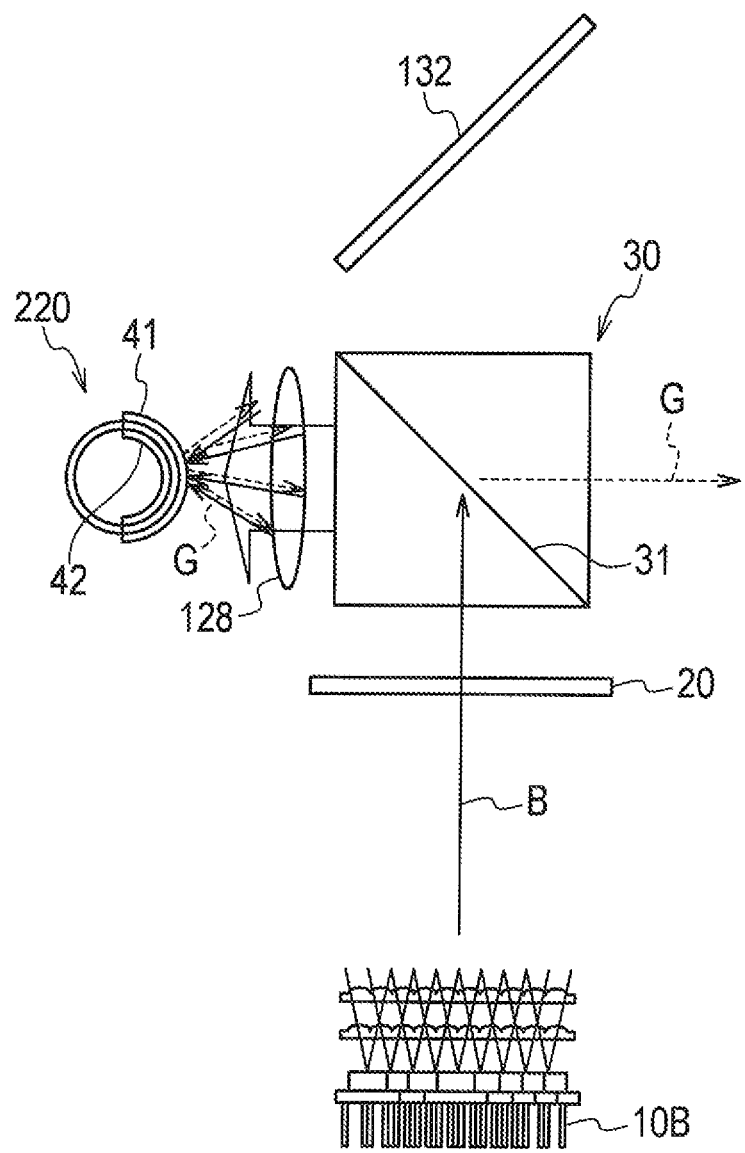
FIG. 20 is a diagram showing a projection display apparatus 100 according to Modification 6.

Hereinbelow, a description is given of a projection display apparatus according to Modification 6 by referring to the drawings. FIG. 20 is a diagram showing a projection display apparatus 100 according to Modification 6. In FIG. 20, the same components as those in FIG. 1 are denoted by the same signs.

As shown in FIG. 20, the projection display apparatus 100 includes a rotary drum 220 instead of the ellipsoidal reflector 40.

Figure 21:
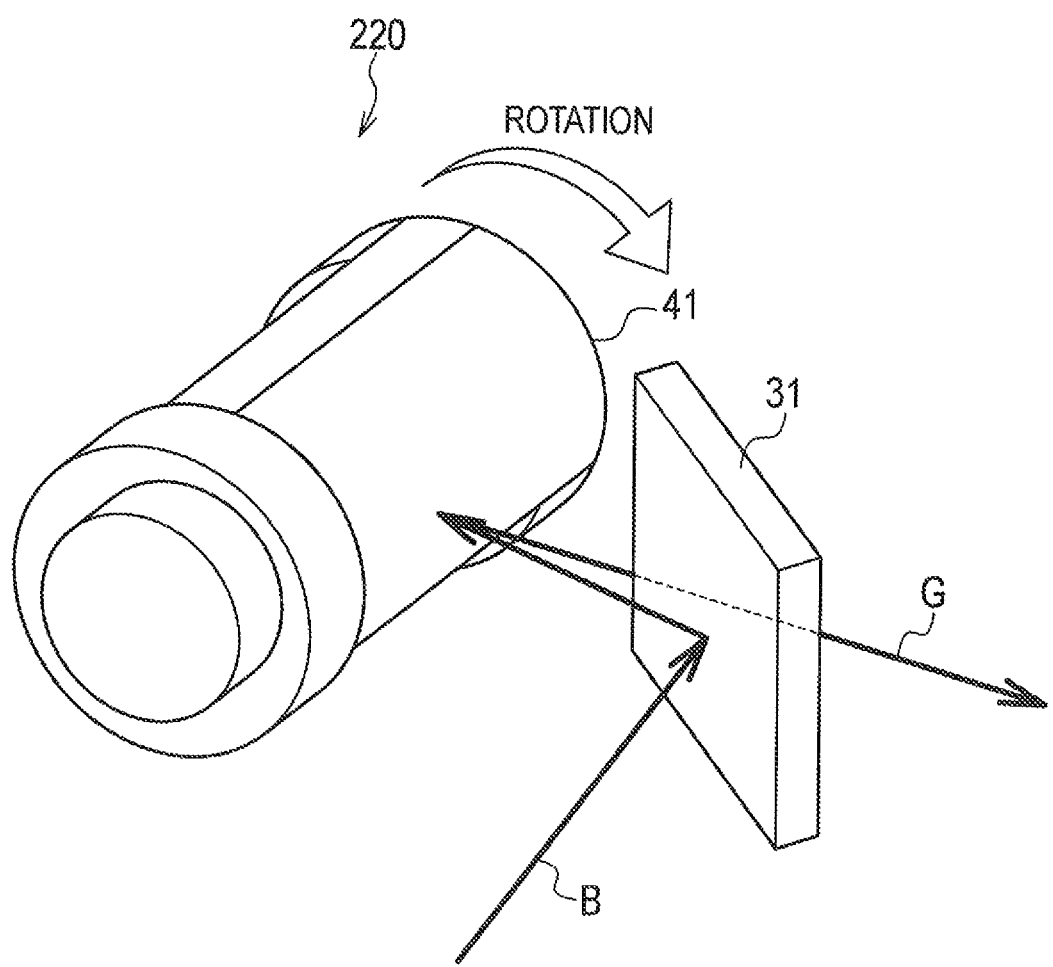
FIG. 21 is a diagram showing a rotary drum 220 according to Modification 6.

The rotary drum 220 is formed so as to be rotatable. As shown in FIGS. 20 and 21, the rotary drum 220 includes a luminous body 41 and a reflection mirror 42. The luminous body 41 is provided along a circumferential surface of the rotary drum 220. The reflection mirror 42 is provided inward of the luminous body 41

The projection display apparatus 100 includes the necessary lens 128. The lens 128 concentrates the blue component light B on the luminous body 41 (reflection mirror 42).

Although First Embodiment illustrates the case where the separation optical element 30 has the plate shape, the separation optical element 30 may have the cubic shape as shown in FIG. 20.

[Other Embodiment]

As described above, the details of the present invention have been described by using the aforementioned embodiment of the present invention. However, it should not be understood that the description and drawings which constitute part of this disclosure limit the present invention. From this disclosure, various alternative embodiments, examples, and operation techniques will be easily found by those skilled in the art.

Although the DMD 110 is illustrated as an imager in the embodiment, the embodiment is not limited thereto. The imager may be a single liquid crystal panel or three liquid crystal panels (a red liquid crystal panel, a green liquid crystal panel, and a blue liquid crystal panel). Each liquid crystal panel may be of a transmission type or a reflection type.

In the embodiment, the light source 10B emits the blue component light B having the high degree of polarization. However, the embodiment is not limited thereto. For example, as long as a polarization element configured to align the polarization states into a single polarization state (P polarization or S polarization) is provided on the light emitting side of the light source 10B, the blue component light B emitted from the light source 10B may have a low degree of polarization.

What is claimed is:

1. A light source apparatus comprising: a light source that emits blue component light; a polarization adjuster that adjusts an entire polarization state of the blue component light emitted from the light source into S-polarization state at a first timing and P-polarization state at a second timing different from the first timing; a separation optical element that separates the blue component light emitted from the light source into a first optical path and a second optical path according to the polarization state adjusted by the polarization adjuster, the first optical path being for using the blue component light as excitation light, the second optical path being for using the blue component light as reference image light; a luminous body provided on the first optical path and that emits reference image light in response to the excitation light; and a combine optical element that combines the first optical path and the second optical path into a single optical path.

2. The light source apparatus according to claim 1, further comprising a separation/combine optical element that separates the blue component light emitted from the light source into a plurality of optical paths for using the blue component light as the excitation light and that combines a plurality of optical paths of the reference image light emitted in response to the excitation light into a single optical path.

3. The light source apparatus according to claim 1, wherein the luminous body is provided on a rotary body provided on the first optical path.

4. A projection display apparatus comprising: a light source that emits blue component light; a polarization adjuster that adjusts an entire polarization state of the blue component light emitted from the light source into S-polarization state at a first timing and P-polarization state at a second timing different from the first timing; a separation optical element that separates the blue component light emitted from the light source into a first optical path and a second optical path according to the polarization state adjusted by the polarization adjuster, the first optical path being for using the blue component light as excitation light, the second optical path being for using the blue component light as reference image light; a luminous body provided on the first optical path and that emits reference image light in response to the excitation light; a combine optical element that combines the first optical path and the second optical path into a single optical path; an imager provided on the single optical path and that modulates light emitted from the combine optical element; and a projection unit that projects light emitted from the imager.

5. A projection display apparatus comprising:
a light source that emits blue component light;
a polarization adjuster that adjusts a polarization state of the blue component light emitted from the light source;
a separation optical element that separates the blue component light emitted from the light source into a first optical path and a second optical path according to the polarization state adjusted by the polarization adjuster, the first optical path being for using the blue component light as excitation light, the second optical path being for using the blue component light as reference image light;

an ellipsoidal reflector provided on the first optical path and having a first focal position and a second focal position;

a luminous body that emits reference image light toward the ellipsoidal reflector in response to the excitation light reflected by the ellipsoidal reflector;

a combine optical element that combines the first optical path and the second optical path into a single optical path;

a rod integrator provided on the single optical path and configured to homogenize light, the light being emitted from the combine optical element;

an imager that modulates light emitted from the rod integrator; and a projection unit that projects light emitted from the imager, wherein the first focal position is provided closer to the ellipsoidal reflector than the second focal position, the luminous body is provided at the first focal position, and a light incident surface of the rod integrator is provided at the second focal position.

6. The projection display apparatus of claim 5, wherein said polarization adjuster adjusts an entire polarization state of the blue component light emitted from the light source into S-polarization state or P-polarization state according to a timing.

\* \* \* \* \*